US009438129B2

(12) United States Patent
Ladron de Guevara et al.

(10) Patent No.: US 9,438,129 B2
(45) Date of Patent: Sep. 6, 2016

(54) INPUT/OUTPUT POWER AND SIGNAL TRANSFER ISOLATOR DEVICE (76) Inventors: Cesar Ladron de Guevara, Las Vegas, NV (US); Leonard Davidson, Henderson, NV (US)

(*) Notice: Subject to any disclaimer, the term of this patent is extended or adjusted under 35 U.S.C. 154(b) by 877 days.

(21) Appl. No.: 13/618,067

(22) Filed: Sep. 14, 2012

(65) Prior Publication Data

US 2013/0088092 A1  Apr. 11, 2013

Related U.S. Application Data (60) Provisional application No. 61/626,985, filed on Oct. 6, 2011, provisional application No. 61/742,875, filed on Aug. 21, 2012.

(51) Int. Cl.
| H02M 3/06 | (2006.01) |
| H02M 5/08 | (2006.01) |
| H02M 1/42 | (2007.01) |
| H01G 4/38 | (2006.01) |
| H01G 4/40 | (2006.01) |
| H02M 1/32 | (2007.01) |

(52) U.S. Cl.
CPC ............. *H02M 5/08* (2013.01); *H01G 4/385* (2013.01); *H01G 4/40* (2013.01); *H02M 1/4266* (2013.01); *H02M 1/32* (2013.01); *Y02B 70/123* (2013.01); *Y02T 10/7022* (2013.01)

(58) Field of Classification Search
USPC .................................................. 307/109, 72
See application file for complete search history.

(56) References Cited

U.S. PATENT DOCUMENTS

| 1,960,415 A | 5/1934 | Miller, Jr. |
| 3,074,146 A | 1/1963 | Wood |
| 4,701,827 A | 10/1987 | Fujikawa et al. |
| 5,166,858 A | 11/1992 | Frake et al. |

(Continued)

FOREIGN PATENT DOCUMENTS

| CN | 2777839 Y | 5/2006 |
| EP | 2199809 A1 | 6/2010 |

(Continued)

OTHER PUBLICATIONS

International Search Report for International Application No. PCT/US 2012/058840 dated Jan. 24, 2013.

(Continued)

*Primary Examiner* — Rexford Barnie
*Assistant Examiner* — Xuan Ly
(74) *Attorney, Agent, or Firm* — Brian Roffe (57) ABSTRACT

Input/output power and signal transfer and power and signal isolator device using pulsed, alternating or high frequency signal current having a capacitive structure which provides power and signal limiting control, unidirectional power and signal transfer and input/output decoupling and transceiver-receiver isolation barrier. The device includes at least two decoupled input electrodes arranged in parallel to each other, and at least two decoupled output electrodes arranged in parallel to each other. Each electrode is connected to at least one terminal. Each electrode has a surface that which is opposed to another electrode surface with at least one layer of dielectric material therebetween. The input electrodes are decoupled from the output electrodes by dielectric material and are disposed such that two output electrodes are separately disposed external to the two input electrodes.

22 Claims, 8 Drawing Sheets

(56) References Cited

U.S. PATENT DOCUMENTS

| | | |
|---|---|---|
| 5,652,423 A | 7/1997 | Saitoh et al. |
| 5,892,198 A | 4/1999 | Barnes et al. |
| 5,901,031 A | 5/1999 | Ishige et al. |
| 6,013,958 A | 1/2000 | Aytur |
| 6,040,744 A | 3/2000 | Sakurai et al. |
| 6,160,441 A | 12/2000 | Stratakos et al. |
| 6,441,449 B1 | 8/2002 | Xu et al. |
| 6,442,213 B1 | 8/2002 | Krone et al. |
| 6,549,765 B2 | 4/2003 | Welland et al. |
| 6,667,506 B1 | 12/2003 | Reedy et al. |
| 6,952,337 B2 | 10/2005 | Yashima |
| 7,495,529 B2 | 2/2009 | Miyaguchi et al. |
| 7,518,266 B2 | 4/2009 | Eckroad |
| 7,821,768 B2 | 10/2010 | Kanno |
| 7,830,130 B2 | 11/2010 | Jacques et al. |
| 8,077,485 B2 | 12/2011 | Lee |
| 8,278,947 B2 | 10/2012 | Moliton et al. |
| 8,384,248 B2 | 2/2013 | Kanno |
| 8,385,045 B2 | 2/2013 | Habu et al. |
| 8,634,772 B2 | 1/2014 | Kanno |
| 8,736,401 B2 | 5/2014 | Kanno et al. |
| 8,781,396 B2 | 7/2014 | Kanno et al. |
| 8,884,720 B2 | 11/2014 | Kanno et al. |
| 9,041,491 B2 | 5/2015 | Sato et al. |
| 2003/0223176 A1 | 12/2003 | Fujii et al. |
| 2004/0222701 A1 | 11/2004 | Kugelman |
| 2007/0209176 A1 | 9/2007 | Kawakubo et al. |
| 2009/0146498 A1* | 6/2009 | Kanno .................... H02M 5/08 307/72 |
| 2011/0133311 A1* | 6/2011 | Watanabe ......... H01L 21/76808 257/532 |
| 2011/0134582 A1 | 6/2011 | Kanno |
| 2011/0157929 A1* | 6/2011 | Sun ........................ H02M 5/00 363/37 |

FOREIGN PATENT DOCUMENTS

| | | |
|---|---|---|
| RU | 2402135 C2 | 10/2010 |
| SU | 1758762 A1 | 8/1992 |

OTHER PUBLICATIONS

Abstract of CN 2777839.

European Search Report for corresponding European Application No. 12838433 dated May 13, 2015.

Developing Reliable Isolation Circuits. When to use a digital isolator vs. an optocoupler—Silicon Laboratories Inc., Austin, TX, undated.

Digital Isolation in Hybrid and Electric Vehicles by Frank Forster at the automotive-eetimes.com website, dated Oct. 6, 2010.

Official Letter from State Intellectual Patent Office (China) for corresponding Chinese Application No. 201280060266.4 dated Nov. 18, 2015.

* cited by examiner

INPUT/OUTPUT POWER AND SIGNAL TRANSFER ISOLATOR DEVICE

CROSS-REFERENCE TO RELATED APPLICATIONS

This application claims priority under 35 U.S.C. §119(e) of U.S. provisional patent application Ser. No. 61/626,985 filed Oct. 6, 2011, and Ser. No. 61/742,875 filed Aug. 21, 2012, both of which are incorporated by reference herein.

BACKGROUND AND SUMMARY OF THE INVENTION

1. Field of the Invention

The present invention relates generally to an input/output power and signal transfer isolator device and method that utilize capacitive methods and structure to transfer alternating current (AC), pulsed power or high frequency signals from an input side to an output side. More specifically, the present invention relates to AC or pulse decoupled structure which electrically and electronically isolates input from output connections, yet permits electrostatic charges to migrate to output terminals, whereby the power and signal transfer occurs.

The present invention also relates generally to a digital isolator or capacitive barrier that allows signal isolation and unidirectional signal transfer from circuitry or a transmitter connected to an input side to be delivered to circuitry or a receiver connected to an output side.

2. Summary of the Invention

A device in accordance with the present invention provides a means for isolating at least two circuitries from each other, one on a primary or input side of the device and one on a secondary or output side of the device. The power supply circuitry, which is connected to the primary side of the device, provides the electrostatic charges to input electrodes. These electrostatic charges on the input electrodes migrate to output electrodes, thus producing unidirectional power and voltage on the output side of the device with the transferred power and voltage from the input side.

The present invention provides many advantages over forward power converter methods, apparatus technologies and inventions as known by those familiar in the art. These advantages of the present invention include, but are not limited to: (1) providing a means for decoupled power and voltage transfers between two circuitries; (2) providing a means for electrical decoupling between two AC power supply sources feeding a common circuit; (3) providing a means for lowering instantaneous short-circuit and transient currents within the decoupled circuitries; (4) providing a means for a decoupled transfer of a controlled amount of power from the input side circuitry to the output side circuitry; (5) providing a means for lowering the amount of power transferred from the input side to the output side upon an overload condition; and (6) providing a means for transferring from the input side to the output side an equivalent voltage value as is referenced as existing on the input side.

The input/output power and signal transfer isolation technique practiced by the present invention has a unique means of utilization of its components, namely, a plurality of input electrodes with at least one dielectric layer between each pair of adjacent input electrodes, and a plurality of output electrodes with at least one dielectric layer between each pair of adjacent of input and output electrodes in a common structure whereby the input electrodes of each pair are adjacent to each other and disposed within a pair of the exterior output electrodes.

An input/output power and signal transfer isolation device in accordance with the invention further comprises metallic film as electrode materials and dielectric materials, between pairs of adjacent electrodes. The input side has means for providing, to the input electrodes, a voltage from an AC power supply contained within the input side circuitry and the output electrodes have means for providing the input referenced voltage of the input side circuitry to the circuitry connected to the output side of the device.

The input/output power and signal transfer isolation device utilizes capacitive methods to transfer AC, pulsed power or high frequency signal from the input side to the output side, and the AC, pulsed power or high frequency signal on the output side is controlled and limited by specified design characteristic options.

BRIEF DESCRIPTION OF THE DRAWINGS

For a more complete understanding of the present invention, reference is made to the following detailed description of the invention considered in conjunction with the accompanying drawings, in which.

DETAILED DESCRIPTION OF THE INVENTION

In the following detailed description, reference is made to the accompanying figures which form a part thereof, and in which is shown, by way of illustration of the principles of the invention, specific embodiments of ways in which the invention may best be practiced. In the drawings, like numerals describe substantially similar components throughout the various views of the embodiments. These embodiments are described in sufficient detail to enable those skilled in the art to practice the invention. Other embodiments of the principles of this disclosure may be used, and various structural and material changes may be made to the embodiments disclosed herein without departing from the scope and principles of the present invention.

Figure 1:
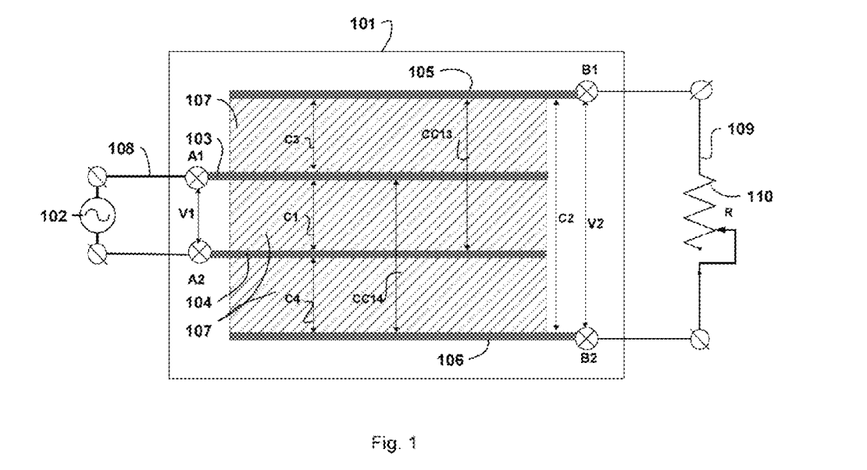
FIG. 1 is a diagram of an input/output power and signal transfer isolation device in accordance with the invention.
Figure 2:
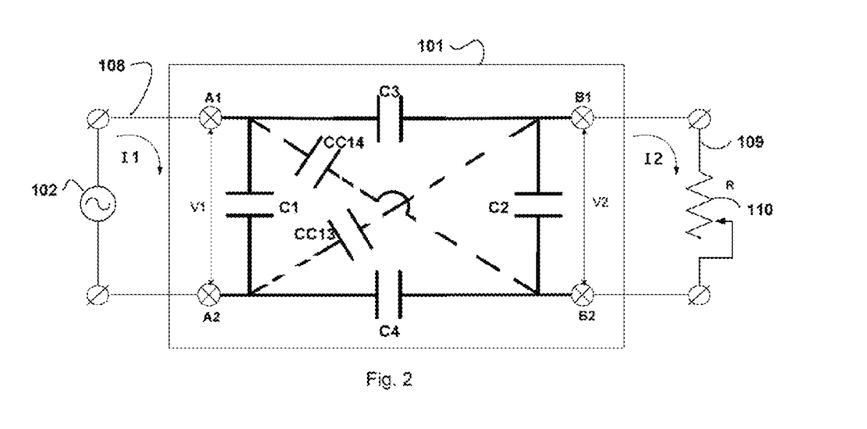
FIG. 2 is a diagram of equivalent circuitry of the input/output power and signal transfer isolation device shown in FIG. 1.

Referring first to FIGS. 1 and 2, in one embodiment of an input/output power and signal transfer isolator device 101, an AC-AC power transfer at, for example, 110 to 125 VAC 102 from an input or primary side (V1—the left of the isolator device 101) to an output or secondary side (V2—the right of the isolator device 101) is accomplished while maintaining the same, or substantially the same, range of voltage as is available on the primary side.

FIG. 1 shows a side view of the internal construction of the isolator device 101 wherein use of thin film capacitive structure is evident. The structure includes two input electrodes 103, 104 and two output electrodes 105, 106 with each pair of adjacent electrodes 103, 104, 105, 106 being separated by one or more layers of a dielectric film 107. As shown, a layer of dielectric film 107 is present between input electrodes 103 and 104, another layer of dielectric film 107 is present between input electrode 103 and output electrode 105, and yet another layer of dielectric film 107 is present between input electrode 104 and output electrode 106. The input and output electrodes 103, 105 are decoupled, and the input and output electrodes 104, 106 are decoupled.

Input electrodes 103, 104 are connected to terminals A1, A2, respectively, by lead connectors and the output electrodes 105, 106 are connected to terminals B1, B2, respectively, by lead connectors. The lead connectors for the input electrodes 103, 104 are decoupled while the lead connectors for the output electrodes 105, 106 are also decoupled. External access to the device 101 is enabled from input circuitry, represented generally as 108, connected to terminals A1, A2 and output circuitry, represented generally as 109, connected to terminals B1, B2.

The foregoing description and illustration in FIG. 1 of the cross-sectional view enables one skilled in the art to manufacture the isolator device 101, e.g., providing a housing and suitable electrical connections and isolations. The capacitive isolator device 101, when manufactured, will have the appearance and sizes similar in fashion to existing capacitor designs as are cataloged by capacitor manufacturers and recognized as such by those familiar in the art. The uniqueness of the isolator device 101 is the presence of two decoupled input leads and two decoupled output leads, with their positioning on the isolator device 101 being dictated by customer and manufacturing design criteria.

The selection of materials from those available for constructing the components of the device 101 shown in FIG. 1 is varied and easily obtainable by those familiar in the art. An exemplifying, non-limiting preferred embodiment of isolator device 101 utilizes electrode and dielectric materials that provide the equivalent capacitance values of 5 uf at position C1 and a decoupled capacitance value of 227 uf at each position C3 and C4 locations (see FIG. 2). With the equivalent capacitance achieved, at the values as previously noted at positions C1 and C3 and C4 locations, the resulting feature of the present invention is a cross capacitance effect deriving equivalent cross capacitance values at locations CC13 and CC14. These cross capacitance values as noted by locations CC13 and CC14 are derived from their relationships with C3 and C4 locations and their values may be expressed as:

$1/CC13=1/C1+1/C3$, therefore $CC13=(C1 \times C3)/(C1+C3)$, and $1/CC14=1/C1+1/C4$, therefore $CC14=(C1 \times C4)/(C1+C4)$, and The equivalent output capacitance values are expressed as;

$1/C2=1/C1+1/C3+1/C4$, therefore $C2=(C1 \times C3 \times C4)/((C3 \times C4)+(C1 \times C4)+(C3 \times C1))$ thus $CC13=CC14=4.89$ uf, and $C2=4.78$ uf.

The maximum power transfer that this preferred embodiment configuration is designed to achieve is about 550 VA and is expressed as:

$Xc$-equivalent=5.8 ohms $\angle -90°$.

Taking into consideration that the maximum current I1 at maximum power transfer is 6.25 amps $\angle 75°$, and the input voltage 120 VAC in angular advanced to 90° with respect the current, the equivalent circuit allows performing the following calculations:

$V\text{output}=V\text{input}-I*Xc$ $V\text{output}=125$ volts $\angle 0°-(6.25$ amps $\angle 75°*5.8$ ohms $\angle -90°)$ $V\text{output}=125$ volts $\angle 0°-36.25$ volts $\angle -25°$ $V\text{output}=88.75$ volts $\angle -25°$ (Vout represents Voutput in the drawings and Vin represents Vinput in the drawings.)

Figure 7:
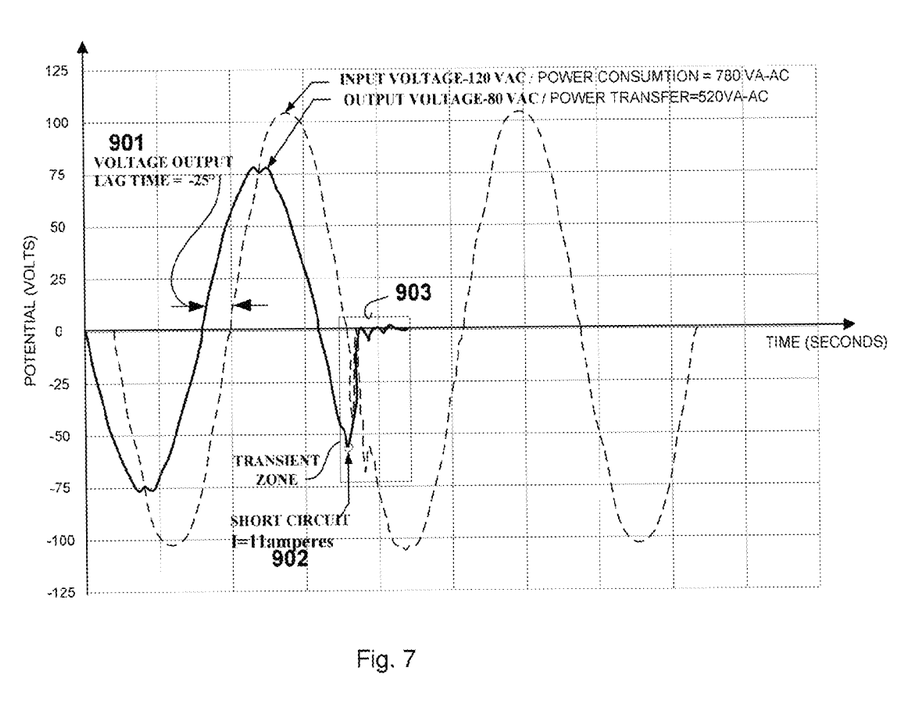
FIG. 7 is a graph of input/output voltage comparison of one embodiment of the invention with a short circuit event indicated.

The voltage output will have a lag time of about −25° with respect an input voltage 701 in this preferred embodiment as is shown in FIG. 7. In FIG. 7, the vertical axis is the potential in volts while the horizontal axis is the time in seconds. The input voltage is shown in a dotted line, 120 VAC, with power consumption equal to 780 VA-AC. The output voltage is shown in a solid line, 80 VAC, with power consumption equal to 520 VA-AC.

The maximum power transfer therefore is calculated as follow:

Power transfer$=I*V$

Power transfer=6.25 amps $\angle 75°*88.75$ volts $\angle -25°$.

Power transfer=554.68 VA

Power transfer of 554.68 VA occurs via the equivalent output capacitance.

In this embodiment, a rheostat resistance load of 15 ohms may be provided. Thus, the total impedance results:

$X\text{total}=15$ ohms $\angle 0°+5.8$ ohms $\angle -90°$ $X\text{total}=16.08$ ohms $\angle -21.12°$ The secondary current, I2, circulating to the output side is about 5.86 amps at about 93.85 volts limiting the power transfer at about 550 VA.

Figure 6:
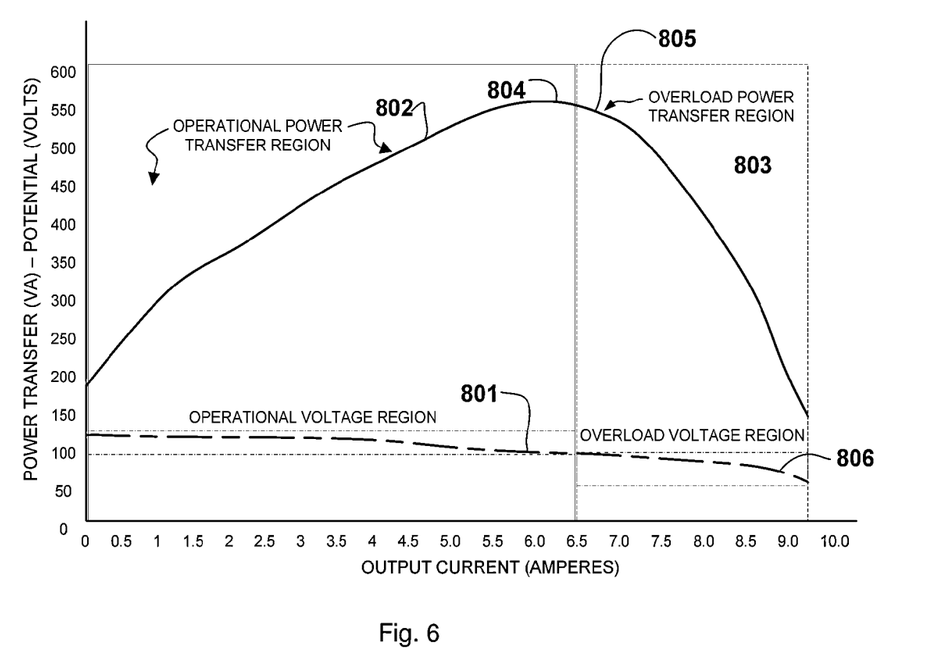
FIG. 6 is a graph of power transfer for one embodiment of the invention.

FIG. 6 depicts the power transfer curve (the solid line) under design conditions of the preferred embodiment described above, wherein the vertical axis is the power transfer (VA) in potential in volts while the horizontal axis is the output current in amperes. The power transfer capability of this preferred embodiment design declines rapidly on overload conditions, the solid line portion designated 805. Thus, on power requirements above about 550 VA, the preferred embodiment delivers lower power transfer, therefore limiting the power transfer on overload conditions.

Consequently, the voltage on the secondary side drops drastically; see the dotted line portion 806 in the overload power transfer region 803. During overload conditions, the primary side maintains the same input power to the input/output power and signal transfer isolator device 101.

This preferred embodiment design further comprises an input power supply of 110-125 VAC 102 and an output circuitry 109 composed of a variable resistive load 110. The variable resistive load 110 connected to the output side circuitry 109 represents dynamic changes in the load condition on the output side.

As shown by the graph in FIG. 6, during incremental load conditions on the secondary side or output circuitry 109 connected to the output terminals B1, B2, the voltage on the secondary side consistently decrease with an increase in power consumption, dotted line portion 801, thus having the power transfer delivery ranging from 0 VA to 550 VA, see solid line portion 802. With a preferred embodiment of the present invention sensing a higher load increment of more than about 550 VA, the present invention enters into an overload condition in overload power transfer region 803 whereby the value of the current circulating does not follow the load increment and no longer transfers the power requested by the load demand.

Under overload conditions, the present invention therefore limits the power transfer as represented by line 804. In overload conditions in overload power transfer region 803, the primary circuitry connected to the input terminals A1, A2 does not experience an incremental increase of power demand in the circulating current that is any higher than the circulating current value that the device design permits to be delivered to the output terminals B1, B2, and to the secondary, output circuitry 109 connected thereto.

As shown in FIG. 7, under short circuit condition 702, a stable disconnect in the range of 0 ohms between the input and output terminals is experienced. The current, under short circuit condition 702, is equal to the voltage present at the input side, divided by the equivalent impedance at short circuit conditions. However, since the equivalent decoupled capacitance values are isolating the input circuitry from the output circuitry, the equivalent short circuit current is equal to input voltage divided by the equivalent output impedance. Upon a short circuit or transient condition 703 in the circuitry connected to the output terminals of the secondary side, the voltage drops to a range approaching about 0.2 volts and the current attains about 11 amps, thus limiting the transient current delivered to the output terminals and the circuitry on the secondary side. The primary side current delivered to the input terminals is 11 amps at about 120 volts, thus limiting the transient current effect on the primary side circuitry.

The invention as described in this preferred embodiment can be utilized as a power limiting and protection device to a power supply whereby an overload condition and short circuit condition would normally damage its transformer and electronics parts, along with damaging the electronic circuitry to where the power supply is delivering the transferred power. However, the present invention prevents such damage.

Other examples of a utilization of the features of the invention include application as a power limiting transfer device and an over current protection device for systems which service distribution, industrial, commercial and residential loads, thus reducing the current transient condition and therefore reducing the size selection of those protective elements in the circuitry, such as fuses and breakers.

Figure 3:
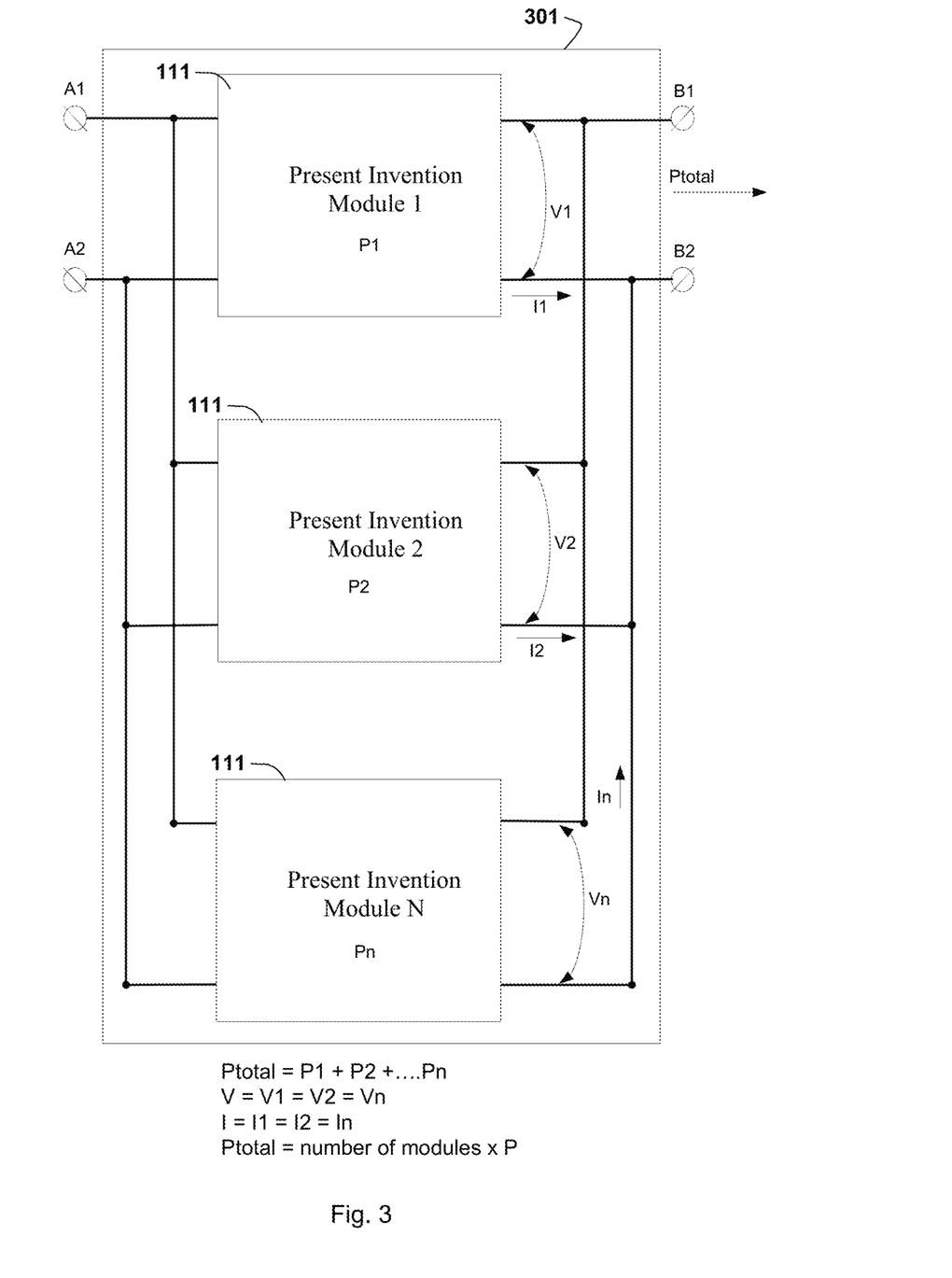
FIG. 3 is a diagram of an integrated system including a plurality of an input/output power and signal transfer isolation devices in accordance with the invention.

Another alternate embodiment of the present invention, as shown in FIG. 3, is a configuration of multiple power transfer isolator devices 101, each housed in or considered as a separate input/output power transfer isolator module 1, 2, . . . , N. The modules 111 are wired in parallel so as to provide power availability that can be increased or decreased in fixed increments in accordance with a control scheme, such as the one described below.

Figure 4:
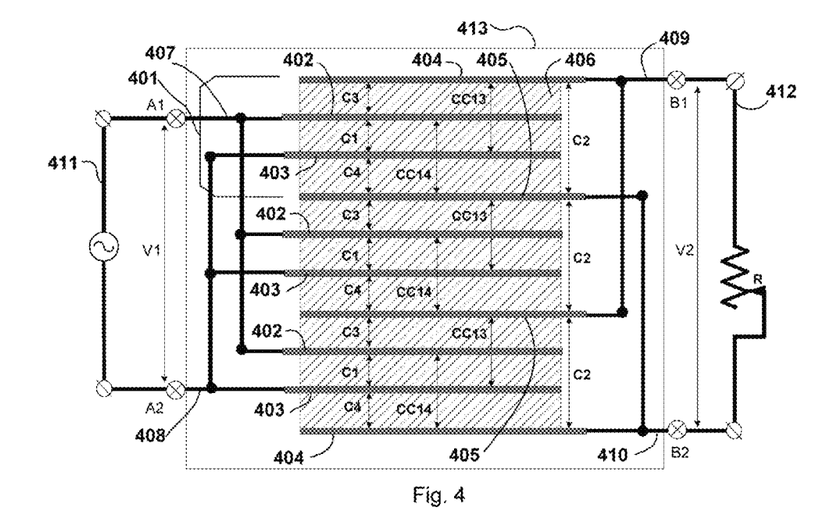
FIG. 4. is a diagram of a system including a plurality of an input/output power and signal transfer isolation devices in accordance with the invention as a single device.

FIG. 3 shows a configuration of multiple power transfer isolator modules 111 connected in parallel in a common assembly or housing 301 so as to provide higher capacity and therefore increase power availability. The modules 111 represented in FIG. 3 can be constructed utilizing the power transfer isolator device 101 configuration shown in FIG. 1 or a plurality of the devices 101 constructed as a single device such as shown in FIG. 4, described below. FIG. 3 also represents configurations of the present invention whereby the individual modules 111 can be interconnected utilizing separate modules connected externally, or a plurality of isolator devices 101 integrated into a single unit. Thus, it is envisioned that one module 111 may have the singular isolator device 101 shown in FIG. 1, while another module 111 may have a plurality of devices 101 constructed as a single device as shown in FIG. 4.

Figure 5:
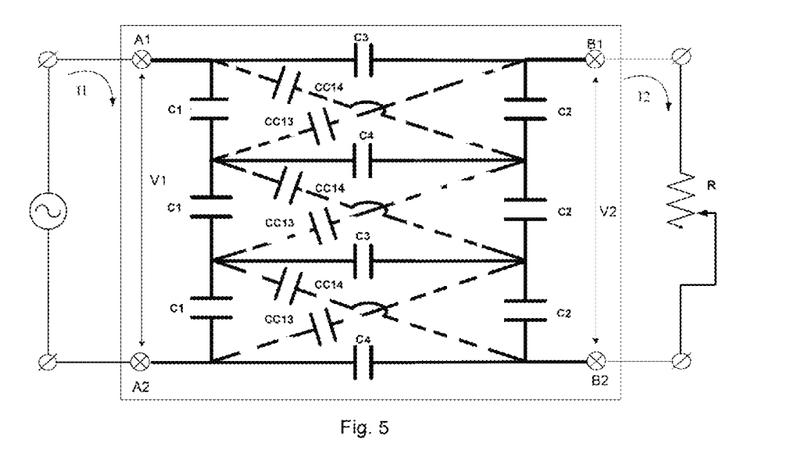
FIG. 5 is a diagram of equivalent circuitry of the system including a plurality of an input/output power and signal transfer isolation devices shown in FIG. 4.

The power of each of the 1, 2, . . . , n modules 111 is P1, P2, . . . , Pn, so that the total Ptotal is equal to P1+P2+ . . . +Pn. The output voltage of each of the modules 111 is the same, i.e., V1+V2= . . . =Vn. Similarly, the output voltage of each of the modules 111 is the same, i.e., I1+I2= . . . =In An alternate embodiment of the present invention to that shown in FIG. 1 is shown in FIG. 4, and its equivalent circuitry is shown in FIG. 5. In this embodiment, a plurality of power transfer isolator devices are layered with the utilization of shared electrodes, as is available when like electrodes and their terminal connections are immediately adjacent to each other in the layering format. The resultant power transfer isolator assembly is referred to by reference number 413. This construction configuration reduces end product size and material usage and thus reducing costs.

More specifically, FIG. 4 shows that assembly 413 includes a plurality of layered power transfer isolator modules 401 and each module 401 includes two input electrodes 402, 403 and two output electrodes 404, 405 with each pair of adjacent electrodes being separated by one or more layers of dielectric film 406. Like electrode placements, as is available when a plurality of modules are positioned immediately adjacent to each other in the layering format, can be utilized as a shared electrode to each of the adjacent layered module 401. The input terminal A1 is connected therefore to the input electrode 407 which is connected to three electrodes 402. Likewise, input terminal A2 is connected to the input electrode 408 which is connected to three input electrodes 403. Output terminal B1 is connected to the output electrode 409 which is connected to two of the output electrodes 404, 405, and the output terminal B2 is connected to the output electrode 410 which is connected to two of the output electrodes 404, 405.

The input terminals A1, A2 and the output terminals B1, B2 provide access to the assembly 413 from outside input circuitry 411 and output circuitry 412, respectively (represented schematically). In this arrangement, the input terminals A1, A2 are decoupled from output terminals B1, B2. This construction configuration reduces end product size and material usage and thus reducing costs. The equivalent circuitry of the device shown in FIG. 4 is shown in FIG. 5.

An understanding of the equivalent circuitry shown in FIG. 5 is obvious from the description of FIG. 4 above.

Figure 8:
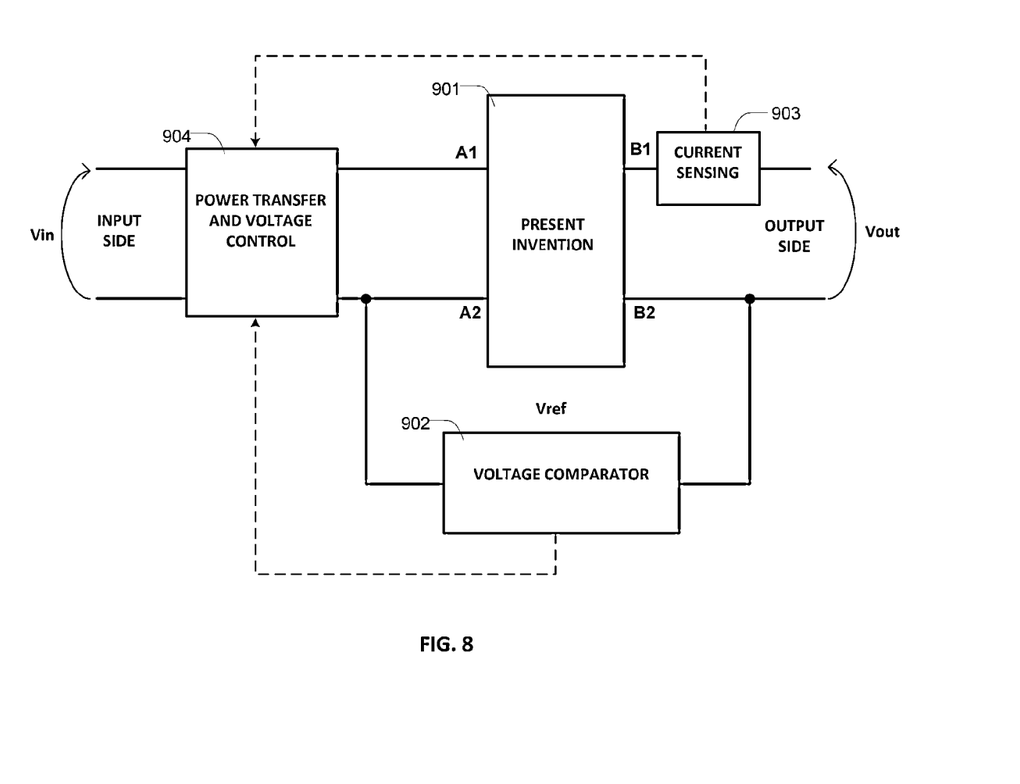
FIG. 8 is a power transfer and voltage monitoring and control schematic.
Figure 9:
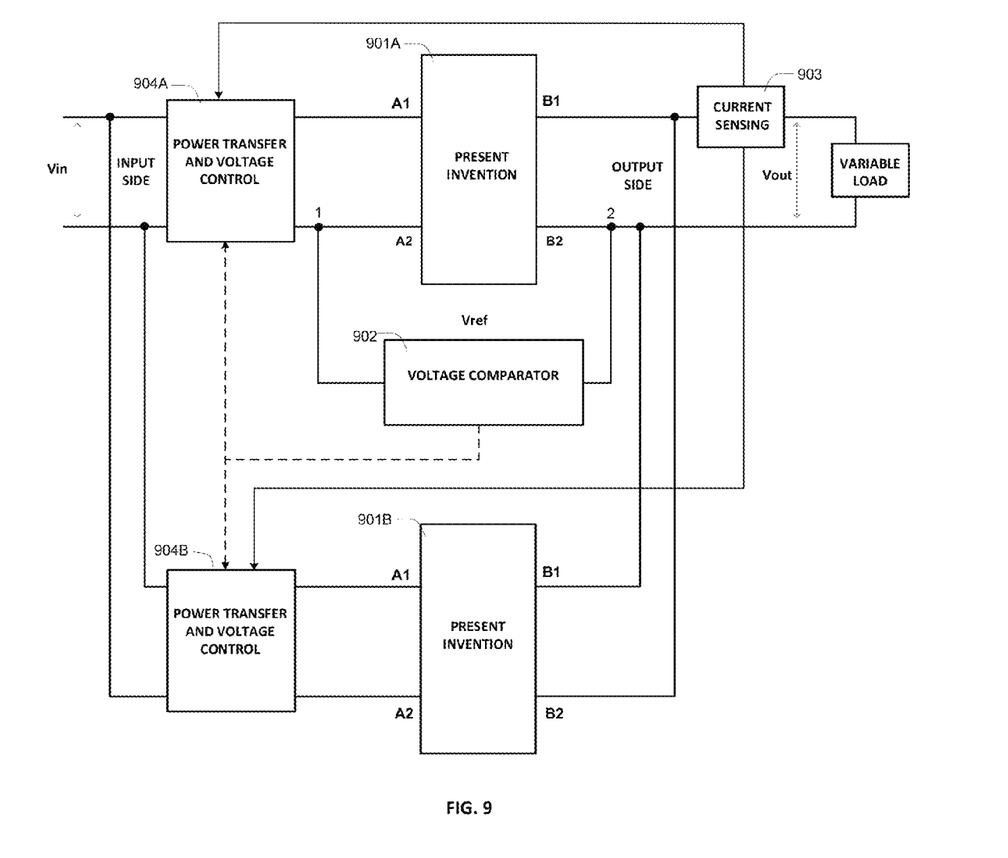
FIG. 9 is a power transfer and voltage monitoring and control schematic with two modules in accordance with the invention connected in parallel.

In another alternate embodiment of the invention exemplified in FIGS. 8 and 9, one or more power transfer isolator modules is monitored and controlled by sensing the voltage across the input terminals A1, A2 and output terminals B1, B2, and/or sensing and monitoring the current utilization on the output load side. This sensing data is delivered to a control circuitry which contains and utilizes instructions to control the operational aspects of the present invention.

In this embodiment, a plurality of modules 111 and their circuitry, e.g., as assembly 413, or a single device 101, form a combined integrated circuit device that provides an automated regulated variable power and signal transfer means while additionally providing the unique functionality as described above.

More specifically, FIG. 8 illustrates an embodiment wherein a plurality of isolator modules 111 is associated with control circuitry in order to dynamically expand the capability and functionality of isolator modules 111. Element 901 represents the plurality of isolator modules 111 and will be referred to as an isolator assembly for the purpose of describing FIG. 8. By incorporating means for automatically sensing the voltage across the second input terminal A2 and the second output terminal B2 of the isolator assembly 901 (Vref, an abbreviation of Voltage$_{reference}$) and current across the first output terminal B1 of the isolator assembly 901, and comparing that data to a preset voltage range of acceptability and comparing data of the preset current range of acceptability, and responding in a prearranged manner to un-acceptable sensed voltage and current data, the controller responds by optimizing utilization of the isolator assembly 901. One way to optimize utilization of the isolator assembly 901 is to incorporate or un-incorporate one or more of the isolator modules 111 from the circuit.

As shown in FIG. 8, the isolator assembly 901 is monitored and controlled by sensing the voltage Vref, by means of a voltage comparator 902, across the input terminal A2 and output terminal B2 under variable load conditions or dynamic load conditions. The voltage Vref between input terminal A2 and output terminal B2 represents the voltage drop percentage during the power and signal transfer. This data is sent to a power transfer and voltage controller 904 on the input side. When the power transfer and voltage controller 904 senses a voltage value exceeding the maximum designated voltage drop, the power transfer and voltage controller 904 engages at least one additional power transfer isolator module 111 in the isolator assembly 901, thus resulting in an increase in the power and signal transfer availability along with having the ability to decrease the voltage drop between terminals A2 and B2.

The designated maximum voltage drop is determined by, for example, the maximum power transfer of the isolator assembly 901. When the maximum power transfer of the isolator assembly 901 is reached, the maximum voltage drop is reached. The maximum voltage drop will follow the curve characteristic of FIG. 6, the dotted line therein. However, the maximum allowable voltage drop can be setup by a controller or voltage regulator and therefore the maximum voltage drop can be set to trigger controlling features such as alarms, a disconnect and/or other features as may be included into the controller's sequences, before or after the maximum power transfer is reached. The maximum power transfer and the maximum voltage drop for an isolator assembly 901 also depend upon other factors, such as, but not limited to, the type of dielectric used to construct the power transfer isolator, the layers and the assembling characteristic. These variables are preferably taken into account upon facilitating the design and manufacturing specifications including the specific user's application. These application variances might be represented as in commercial uses in 50-60 Hz frequencies where the acceptable voltage drop is not higher than about 5%, and in electronic applications, specifically in signal transfer isolation, where the acceptable voltage drop can be anywhere between about 5% to about 50%.

If there is a decrease load demand, a current sensor 903 detects the decreased current across terminal B1 as is sensed by the controller 904. The controller 904 responds by disengaging at least one of the isolator modules 111 in the isolator assembly 901.

During short circuit or transient conditions, the current sensor 903, the voltage comparator 902 and the power transfer and voltage control devices or controller 904, are isolated from being damaged because the isolator assembly 901 limits the short circuit and transient conditions, thus permitting the power transfer and voltage controller 904 to respond by interrupting the power and signal transfer without the event causing damage to the load side circuitry and the control circuitry.

FIG. 9 illustrates an embodiment wherein control circuitry is combined with a plurality of power transfer isolator assemblies 901A, 901B to dynamically expand the capability and functionality of the isolator assemblies 901A, 901B. By incorporating means for automatically sensing the voltage across an input terminal A2 and output terminals B1, B2 of multiple isolator assemblies 901A, 901B (Vref) and for sensing current across the opposite output terminals of the same isolator assemblies, and comparing that data to a preset voltage range of acceptability and comparing data of the preset current range of acceptability, and responding in a prearranged manor to un-acceptable sensed voltage and current data, the controller responds by incorporating or un-incorporating the utilization of one or more of the isolator modules 111 in the isolator assemblies 901.

In a similar manner as in the embodiment shown in FIG. 8, in the embodiment shown in FIG. 9, the isolator assemblies 901A, 901B are monitored and controlled by sensing the voltage Vref, by means of a voltage comparator 902, across the input terminal A2 and output terminal B2 of one isolator assembly 901A and output terminal B1 of another isolator assembly 901B under variable load conditions or dynamic load conditions. The voltage Vref between A2 and B1, B2 represents the voltage drop percentage during the power and signal transfer. This data is sent to the power transfer and voltage controllers 904A, 904B.

When the power transfer and voltage controller 904A senses a voltage value exceeding the maximum designated voltage drop, the power transfer and voltage controller 904A engages at least one additional power transfer isolator module in isolator assembly 901A, thus resulting in an increase in the power and signal transfer availability along with having the ability to decrease the voltage drop between terminals A2 and B1, B2.

When the power transfer and voltage controller 904B senses a voltage value exceeding the maximum designated voltage drop, the power transfer and voltage controller 904B engages at least one additional power transfer isolator module in isolator assembly 901B, thus resulting in an increase in the power and signal transfer availability along with having the ability to decrease the voltage drop between terminals A2 and B1, B2.

If there is a decrease load demand, a current sensor 903 detects the decreased current across terminals B1 and B2 as is sensed by the controller 904A. The controller 904A responds by disengaging at least one of the isolator assemblies 901B.

During short circuit or transient conditions, the current sensor 903, the voltage comparator 902 and the power transfer and voltage control devices or controllers 904A, 904B, are isolated from being damaged because the isolator assemblies 901A, 901B limits the short circuit and transient conditions, thus permitting the power transfer and voltage controllers 904A, 904B to respond by interrupting the power and signal transfer without the event causing damage to the load side circuitry and the control circuitry.

In another alternate embodiment of the present invention, a plurality of power transfer isolator modules are arranged in layers and connected to a selection switch device whereby a specified design range of input power and output power can be selected by the user in a real time working environment.

The increment of the voltage drop at the output side of the device is preferably proportional to the increment of the power transfer until the point of maximum power transfer is reached whereby the voltage drop is approximately 10% to 25% of the input voltage applied to the device.

With the added benefit of a controlling circuitry, as is in an alternate embodiment of the present invention, and as depicted in FIG. 8, a voltage differential between the input side and the output side of the device can be sensed by controlling circuitry whereby the control circuitry can engage other, available modules that are wired in parallel, as depicted in FIG. 9, to compensate for the voltage drop up to a certain design limit and follow the power consumption variations at the output side while maintaining the voltage drop under certain predetermined ranges.

Control circuitry connected between the input side and the output side, e.g., the power transfer and voltage control 901, also can interrupt momentarily or permanently the power transfer under overload condition, voltage transient or short circuit condition at the output side of the present invention.

This control circuitry, e.g., the power transfer and voltage control 901, may be configured to sense the direct voltage equivalent to the voltage drop in percentage, and compare the signal to a preset range for allowable voltage drop for normal operation, and a preset set point for voltage drop or threshold for overload condition. Since the power transfer occurs continuously, the voltage control circuitry controls continuously the voltage at the output side.

In high frequency applications, or as a digital isolator, or as a capacitive barrier, the device in accordance with present invention provides a necessary or a least preferred means for isolating at least two circuitries from each other, allowing a unidirectional signal transfer from a transmitter to receiver circuitry, or more generally from the input side to output side. This may be achieved based on the equivalent differential capacitance between the input capacitance and the output capacitance. The equivalent differential capacitance of input capacitance may be at least twice a value of output capacitance.

In high frequency applications, the device in accordance with the present invention can be used as digital isolator or capacitive barrier where the signal is transferred unidirectionally across a capacitive barrier. An advantage of the present invention over previous designs is that a capacitor barrier structure, e.g., electrodes separated by dielectric film (see FIGS. 1 and 4), provides for a unidirectional power and signal transfer as well as a controlled power and signal transfer, thus eliminating many components as is required in the current isolation transceiver-receiver circuitry technologies being used.

One or more features of the present invention can be utilized in the following applications:

Digital Isolators in, for example, (a) hybrid and electric vehicles, (b) replacement optocouplers, (c) CMOS drivers, (d) plasma display drivers, (e) industrial fieldbus, such as: Modbus', Profibus', DeviceNet™ Data Buses, Smart Distributed Systems (SDS™), (f) computer peripheral interfaces, (g) servo control interfaces, and (h) data acquisition circuitries.

Capacitive power transfer circuitries in, for example, (a) solar power plants, (b) multi-source power controllers, and (c) cellular and other devices that utilize RF low power charger devices.

In essence, the present invention may be considered to be an advanced digital isolator and a capacitive insulation barrier. Other forms of such devices are currently utilized and well known in the art and perform in many applications some of which are described above.

The following are specific examples of where and how the present invention can be utilized commercially.

As an example of use in forward power converters, reference is made to U.S. Pat. No. 7,830,130 to Jacques et al. that describes a method and apparatus for controlling a resonant discontinuous forward converter (RDFC). The apparatus includes a transformer, a cyclical switch DC to power the primary windings of the transformer, a converter to DC coupled to the secondary of the transformer and a control circuitry that controls the switch response base on primary winding current with a threshold value. The method and circuitry allegedly protect the transformer from overload condition and have a controlled output voltage, with a preferred implementation being configured for AC-DC power conversion. A major drawback of this forward converter is that it does not have inherently good power and current limiting, leading a high current on cut short conditions consequently damaging the controller and the other associated components that are exposed to the transient current.

By contrast, in accordance with the present invention there is no need to have a controller to forward power since the equivalent cross capacitance and a decoupling equivalent capacitance can determine the maximum amount of power which can be transferred. A voltage-current curve with a load increment is practically flat, having a voltage variation within a range of about 2.5%, until a maximum load for the particular design of the present invention is reached. When an overload condition is present, the voltage drops with the increment of the current until the limited current provided in accordance with the present invention is reached. In cut short (short circuit), and transient conditions, a device in accordance with the present invention inherently limits the transient currents and thus the primary side of the device is not affected by cut short and transient conditions. At the same time, however, the device has an excellent response to power and current limiting.

Reference is also made to U.S. Pat. No. 7,518,266 to Eckroad that describes a method and apparatus for an electric power transmission system that isolates a local AC transmission network from surrounding AC system. A local AC load center has a plurality of local AC loads, and a distribution feeder serves the plurality of local AC loads and at least one distant electric power generation station or other power sources for supplying AC power to the local AC load center. A complete or partial DC transmission ring is interposed between the local AC load center and the distance electric power generating station for isolating the AC power received from the distance electric power generating station from the local AC load center by converting the AC power to DC power. The DC power is re-converted into AC power based on load requirements. The distribution feeder supplies the AC power, while all local AC loads are isolated from the distant electric power generation station.

While this system provides isolation means by having an AC-DC-AC power delivery network, to implement this system, it is required to construct and install the DC ring to create the sub-distribution inter-phase. All of which are likely to be extremely costly. Moreover, the DC ring and power converter AC-DC-AC centers, as well as the existing AC transmission and distribution systems are subject to short circuit and system faults. Therefore, the DC sub-distribution system will likely lose the isolation principles sought by the techniques disclosed in Eckroad.

Another drawback of Eckroad is the fact that in order to convert from DC to AC, it is required that at least one conversion base center is constructed and operational, significantly increasing the operating cost of that system.

By contrast, with the devices in accordance with the present invention installed in existing substations, transmission and distribution stations, along with sub-distribution stations and centers interposing between the transmission line and the transformer and at the secondary transformer side, the remarkable isolating characteristics provided in accordance with the present invention not only isolate both sides of the transmission, distribution and load centers, but also limits the short circuit irruptive current by which overload and short circuit protection can be calculated for a lower limit. This saves overall costs in design, construction and operation of transmission, distribution and load centers. Another important feature of the present invention is that when it is used in transmission, distribution and load centers, the power factor of the network will be improved significantly.

Figure 10:
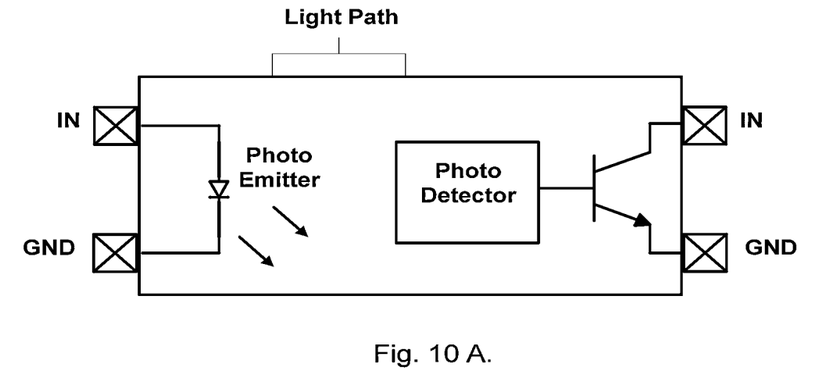
FIG. 10A is a diagram of a prior art optocoupler.
FIG. 10B is a diagram of a prior art ISOPro RF isolator.
FIG. 10C is a diagram of an input/output power and signal transfer isolator in accordance with the invention.

Finally, reference is made to an article entitled "Developing Reliable Isolation Circuits. When to use a digital isolator vs. an optocoupler"—Silicon Laboratories Inc., Austin, Tex. While optocouplers have been utilized as the dominant signal isolation device for many years, the schematic of which is shown in FIG. 10A, the advent of the ISOpro RF isolator shown in FIG. 10B, provides designers a smaller, more integrated, faster, and lower power utilization alternative with none of the instability or limited life expectancy mechanisms of optocouplers. The current technology of ISOpro isolators are the best-in-class RF isolators and enable designers to access world-class isolator technology in a single package that is as easy to apply as a CMOS logic gate.

Shared benefits of a device in accordance with the present invention and ISOpro isolators include:
Higher integration: smaller size and lower cost-per-channel on multi-channel versions.
Higher performance: faster, tighter timing and substantially lower power utilization.
Longer service life: no wear-out mechanisms as is in optocouplers.
Higher reliability: operating parameters remain stable over VDD, temperature, and device age.
High CMTI: fully differential isolation signal path and high receiver selectivity for CMTI greater than 25 kV/µs.
Low EMI: meets FCC Class B Part 15.
High electric-field immunity: >20 V/m, as measured by independent laboratories.
Industry-leading ESD tolerance: 4 kV HBM on all devices.
Lower external bill-of-materials: requires only two inexpensive VDD bypass capacitors as in the ISOpro, with none required with the present invention.
Easy to use: single-chip, complete isolation solution.

Nevertheless, the present invention provides an improvement over ISOpro technologies. Benefits of the present invention over the ISOpro technologies include:
The ISOpro requires transceiver-receiver circuitry to achieve the unidirectional power transfer through the capacitor barrier; whereas a device in accordance with the present invention achieves the unidirectional power transfer without the necessity of the XMTR-RCVR circuitry and the VDD bypass capacitors.
Lower external bill of materials.
Controlled power transfer.

The history of the semiconductor industry is one of ever-increasing device performance and cost effectiveness with each process generation. Monolithic devices have always supplanted their hybrid counterparts, and RF isolation versus the hybridized optocoupler is no different.

As shown in FIG. 10C, the device in accordance with the present invention can be utilized as a power limiting and protection device that is added to and integrated into RF power supplies and digital isolators. The device 30, interposed between RF circuitry 32 and an RF-DC conversion unit 34, would protect the power supply against an overload condition and short circuit condition which could damage its transformer and electronic parts, along with protecting against damage to the electronic circuitry to where the power supply is delivering the transferred power.

There are other valid examples of RF isolators and power supplies with signal isolators, such as the MAX256, manufactured by MAXIM. The MAX256 is an integrated primary-side controller and H-bridge driver for isolated power-supply circuits. The MAXIM device contains an on-board oscillator, a protection circuitry and internal FET drivers to provide up to about 3 W of power to the primary winding of a transformer. The MAX256 can be operated using the internal programmable oscillator or can be driven by an external clock for improved EMI performance. Regardless of the clock source being used, an internal flip-flop stage guarantees a fixed 50% duty cycle to prevent DC current flow in the transformer. A power and signal transfer and power and signal isolator device in accordance with any of the embodiments described herein can be positioned instead of the MAX256's transformer and resistors as are present in the isolation circuitry and specifically on the output side of the MAX256. Having the present invention in that position, the integrated primary-side controller and H-bridge driver and the isolated power-supply are protected against short circuit conditions, transients, DC current flows, and yet also enables unidirectional power transfer to supply the 3 watts of power that the integrated primary-side controller and H-bridge driver can transfer.

The invention, in any of the above-described embodiments, provides substantial advantages. For example, one or more embodiments of the present invention provide an input/output power and signal transfer isolator device that utilizes capacitive methods to transfer AC, pulsed power or high frequency signal from the input side to the output side, and the AC, pulsed power or high frequency signal as delivered to the output side, is controlled and limited by a variety of specified design characteristic options.

Further, one or more embodiments of the present invention provide an input/output power and signal transfer isolator device and method wherein the input side of the capacitive arrangement is electrically isolated from the output side, and vice versa.

One or more embodiments of the present invention provide an input/output power and signal transfer isolator device and method wherein transient, short circuit and overload conditions originating on the output side are isolated and limited in magnitude from affecting the input side, as well as providing the same isolation characteristics from a similar event conditions occurring on the input side and not having a catastrophic affect on the device and the circuitry that is continued from the output side.

Another advantage of one or more embodiments of the present invention is that an input/output power and signal transfer isolator device and method are provided wherein an AC, pulsed power or high frequency signal transfer from the input side of the capacitive arrangement is unidirectional to the output side, and wherein the input equivalent capacitance value is at least three times the equivalent capacitance value than the output equivalent capacitance value, thus creating a potential barrier for energy traveling from the output side to the input side.

Yet another advantage of one or more embodiments of the present invention is that an input/output power and signal transfer isolator device and method are provided wherein an AC, pulse voltage or high frequency signal in an output side of a capacitive arrangement is proportional to an input voltage or high frequency signal reference of the capacitive arrangement.

Still another advantage of one or more embodiments of the present invention is that an input/output power and signal transfer isolator device and method are provided wherein an AC, pulse voltage or high frequency voltage signal in an output side is diphase minus 90 degrees in reference to the AC, pulse current or high frequency current signal in the output side.

Another advantage of one or more embodiments of the present invention is that an input/output power and signal transfer isolator device and method are provided wherein an AC, pulse or high frequency signal is propagated from the input side wherein the input electrodes propagate the AC, pulse or high frequency signal through the dielectric in opposite directions toward the output side of electrodes.

Further advantages of one or more embodiments of the present invention include providing a device that offers performance features yet is compact and less complex in structure than what is currently utilized by those familiar in the art to perform equivalent functions, providing a single device that delivers multiple functionalities, providing device design options that can be constructed as a unitized embedded product as well as a modularly assembled product, and providing device design options that can be constructed from selected capacitors integrated into a capacitive circuitry which duplicates the capacitive associations.

Another advantage of one or more embodiments of the present invention is that an input/output power and signal transfer isolator device and method are provided that enable power transfer control, voltage control and means of monitoring same by sensing voltage present between the input side and the output side, by sensing current present at the output side when connected to a load, or that has adjustable set points and ranges of operation.

Still another advantage of one or more embodiments of the present invention is that an input/output power and signal transfer isolator device and method are provided that enable power transfer control, voltage control and means of monitoring same, and which detects an overload condition, by sensing a power transfer limit and a voltage drop limit at the output side of the input/output power and signal transfer isolator device.

Yet another advantage of one or more embodiments of the present invention is that an input/output power and signal transfer isolator device and method are provided wherein monitored voltage and the monitored current provide a signal input to a control circuit that controls the power transfer to the load and maintains the output voltage within a predetermined range.

Yet another advantage of one or more embodiments of the present invention is that an input/output power and signal transfer isolator device and method are provided wherein a plurality of the devices can be connected in parallel and the power transfer control, voltage control and monitoring of each device engage sequentially as a means of control. For example, the utilization of the plurality of modules follows the increment of power demand of the load continuously by sensing the increment in the voltage as the means of monitoring. That is, an additional power transfer and isolator module from a number of available power transfer and isolator modules may be brought online or its functionality incorporated into the device for each increment in power, with the assessment of the increment and attendant need for an additional power transfer and isolator module possibly being based on sensed voltage. Utilization of the plurality of modules additionally or alternatively follows a decrement or decrease of power in the load continuously by, for example, the sensing of changes in output current and disengaging sequentially the multiple isolator modules, whose functionality was previously incorporated into the device. That is, the functionality of a power transfer and isolator module is removed from the device for each decrement in power, with the assessment of the decrement and attendant need for removal of a power transfer and isolator module being based on sensed current.

Still another advantage of one or more embodiments of the present invention is that an input/output power and signal transfer isolator device and method are provided wherein a plurality of the devices and power transfer controls, voltage controls and monitoring options are constructed as a unitized embedded device as well as assembled individual modules.

Additional background information about the field of the invention is provided by an article entitled "Digital Isolation In Hybrid and Electric Vehicles" by Frank Forster at the automotive-eetimes.com website, dated Oct. 6, 2010, as well as a publication entitled "Developing Reliable Isolation Circuits: When to use a digital isolator vs. an optocoupler" by Silicon Laboratories Inc., Austin, Tex., both of which are incorporated by reference herein.

Many other effective alternatives of the invention will occur to the skilled person in view of the disclosure herein. It will be understood that the invention is not limited to the described embodiments and encompasses such alternatives and modifications apparent to those skilled in the art lying within the spirit and scope of the claims appended hereto.

What is claimed is:

1. A capacitive device for an alternating current (AC) circuit interposed between an AC source and a load, comprising:
a set of terminals comprising at least first and second input terminals and at least first and second output terminals that are different than said first and second input terminals, said first and second input terminals and said first and second output terminals being configured in the capacitive device such that when said first and second input terminals are connected to the AC source and said first and second output terminals are connected to the load, electrical power from the AC source enters the capacitive device through said first and second input terminals and is moved forward unidirectional to the load through the capacitive device and said first and second output terminals; and at least one power transfer and isolator module that transfers power from said first and second input terminals to said first and second output terminals, each of said least one power transfer and isolator module comprising:
  a first set of two electrode assemblies comprising two decoupled input electrodes, a first one of said input electrodes being coupled to said first input terminal and a second one of said input electrodes being coupled to said second input terminal; and
  a second set of electrode assemblies comprising two decoupled output electrodes, a first one of said output electrodes being coupled to said first output terminal and a second one of said output electrodes being coupled to said second output terminal;
  said first and second input electrodes both being situated between said first and second output electrodes,
  said first and second input electrodes being spaced apart from one another and being spaced apart from an adjacent one of said first and second output electrodes to enable capacitance to develop between each of said first and second input electrodes and each of said first and second output electrodes when current flows through the AC circuit,
whereby properties of the first and second input electrodes, the first and second output electrodes and the dielectric material are such that an equivalent differential capacitance of input capacitance is greater than a value of output capacitance.

2. The device of claim 1, further comprising at least one layer of dielectric material between each adjacent pair of said input and output electrodes.

3. The device of claim 1, wherein said at least one power transfer and isolator module comprises a plurality of power transfer and isolator modules arranged in a parallel wiring configuration.

4. The device of claim 1, wherein said first and second input electrodes are decoupled from said first and second output electrodes.

5. The device of claim 1, wherein the device is a high frequency digital isolator.

6. The device of claim 1, wherein the device is a capacitive barrier for radio frequency signals.

7. The device of claim 1, wherein said at least one power transfer and isolator module further comprises:
  a third set of two electrode assemblies comprising two decoupled input electrodes, a first one of said input electrodes of said third set being coupled to said first input terminal and a second one of said input electrodes of said third set being coupled to said second input terminal;
  said first and second input electrodes of said third set being situated on an opposite side of said second output electrode of said second set from said first and second input electrodes of said first set; and
  a fourth set of two electrode assemblies comprising two decoupled output electrodes, a first one of said output electrodes of said fourth set being coupled to said first output terminal and a second one of said output electrodes of said fourth set being coupled to said second output terminal;
  said first and second input electrodes of said third set both being situated between said first and second output electrodes of said fourth set,
  said first and second input electrodes of said third set being spaced apart from one another and being spaced apart from an adjacent one of said first and second output electrodes of said fourth set to enable capacitance to develop between each of said first and second input electrodes of said third set and each of said first and second output electrodes of said fourth set when current flows through the AC circuit;
  said second output electrode of said second set being the same as said first output electrode of said fourth set.

8. The device of claim 1, further comprising:
  a voltage monitor connected between said second input terminal and said second output terminal;
  a current monitor configured to be connected in series with said first output terminal and the load; and
  a power transfer and voltage controller connected to said first input terminal and said second input terminal in series with said at least one power transfer and isolator module.

9. The device of claim 8, wherein said voltage monitor comprises a voltage comparator that compares voltage at said second output terminal to voltage at said second input terminal, said voltage comparator being coupled to said power transfer and voltage controller to enable said power transfer and voltage controller to control said at least one power transfer and isolator module based on comparison of voltage at said second output terminal to voltage at said second input terminal.

10. The device of claim 8, wherein said current monitor comprises a current sensor that senses current at said first output terminal, said current sensor being coupled to said power transfer and voltage controller to enable said power transfer and voltage controller to control said at least one power transfer and isolator module based on current sensed at said first output terminal.

11. A method of moving power forward from an alternating current (AC) source to a load through an AC circuit using a capacitive arrangement including at least one power transfer and isolator module comprising first and second decoupled output electrodes, first and second decoupled input electrodes arranged between the first and second output electrodes, and dielectric material disposed between each adjacent pair of electrodes, the method comprising:
  connecting the first and second input electrodes to the AC source via first and second input terminals, the first input electrode being connected to the AC source via the first input terminal and the second input electrode being connected to the AC source via the second input terminal;
  connecting the first and second output electrodes to the load via first and second output terminals that are different than the first and second input terminals, the first output electrode being connected to the load via the first output terminal and the second output electrode being connected to the load via the second output terminal; and
  inducing a potential across the first and second output electrodes connected to the load by capacitance between each of the first and second input electrodes connected to the AC source and each of the first and second output electrodes connected to the load such that electrical power from the AC source enters the capacitive arrangement through the first and second input terminals and is moved forward unidirectional to the load through the capacitive arrangement and the first and second output terminals, and whereby properties of the first and second input electrodes, the first and second output electrodes and the dielectric material are such that an equivalent differential capacitance of input capacitance is greater than a value of output capacitance, whereby input circuitry connected to the first and second input terminals is isolated from being compromised by a condition resulting from a fault experienced in output circuitry connected to the first and second output terminals.

12. The method of claim 11, wherein the first and second input electrodes are electrically AC-AC and high frequency signal input electrodes, further comprising decoupling and insulating the electrically AC-AC and high frequency signal input electrodes from the first and second output electrodes.

13. The method of claim 12, further comprising selecting the first and second input electrodes, the first and second output electrodes and the dielectric material such that power transfer from the first and second input electrodes to the first and second output electrodes is directly proportional to an equivalent decoupled capacitance value existing between the first input electrode and the first output electrode and the capacitance value between the second input electrode to the second output electrode.

14. The method of claim 12, further comprising selecting the first and second input electrodes, the first and second output electrodes and the dielectric material such that power transfer from the first and second input electrodes to the first and second output electrodes is proportional to equivalent cross capacitances produced by a capacitance relationship between the first input electrode and the second output electrode and the second input electrode in relation with the first output electrode.

15. The method of claim 11, further comprising selecting the first and second input electrodes, the first and second output electrodes and the dielectric material such that the equivalent differential capacitance of input capacitance is at least twice the value of output capacitance.

16. The method of claim 11, further comprising selecting the first and second input electrodes, the first and second output electrodes and the dielectric material such that an equivalent differential capacitance between input capacitance and output capacitance provides the unidirectional movement of power forward from an input side of the capacitive arrangement to an output side of the capacitive arrangement.

17. The method of claim 11, further comprising:
sensing a voltage between an input side of the capacitive arrangement and an output side of the capacitive arrangement;
sensing current at the output side when connected to the load; and
controlling the at least one power transfer and isolator module based on the sensed voltage and sensed current to provide adjustable set point and range of operation or maintain an output voltage within a predetermined range.

18. The method of claim 11, wherein the at least one power transfer and isolator module comprises a plurality of power transfer and isolator modules, further comprising configuring the plurality of power transfer and isolator modules in a parallel wired configuration to increase power transfer capability.

19. The method of claim 18, further comprising:
sensing a voltage between an input side of the capacitive arrangement and an output side of the capacitive arrangement;
sensing current at the output side when connected to the load; and
controlling the power transfer and isolator modules based on the sensed voltage and sensed current to provide adjustable set point and range of operation or maintain an output voltage within a predetermined range.

20. The method of claim 18, further comprising:
sensing a voltage between an input side of the capacitive arrangement and an output side of the capacitive arrangement;
sensing a current at the output side when connected to the load; and
controlling the power transfer and isolator modules to at least one of:
sequentially and individually engage functionality of the power transfer and isolator modules to follow an increment of power in the load being provided with power through the capacitive arrangement based on changes in the sensed voltage, and
sequentially and individually disengage functionality of the power transfer and isolator modules to follow a decrement of power in the load based on changes in the sensed current.

21. An electrical system, comprising:
the device of claim 1;
the load;
the AC source;
input circuitry for connecting said first and second input terminals to the AC source; and
output circuitry for connecting said first and second output terminals to the load.

22. The method of claim 11, wherein the dielectric material is dielectric film.

* * * * *